(12) United States Patent
Smith et al.

(10) Patent No.: US 9,409,750 B2
(45) Date of Patent: Aug. 9, 2016

(54) REMOVABLE VEHICLE TOP LIFT SYSTEM

(71) Applicant: Lange Originals, LLC, Salt Lake City, UT (US)

(72) Inventors: Carter Smith, Salt Lake City, UT (US); Kerby Smith, Salt Lake City, UT (US); Tobin Gunderson, Salt Lake City, UT (US)

(73) Assignee: Lange Originals, LLC, Salt Lake City, UT (US)

( * ) Notice: Subject to any disclaimer, the term of this patent is extended or adjusted under 35 U.S.C. 154(b) by 34 days.

(21) Appl. No.: 14/177,141

(22) Filed: Feb. 10, 2014

(65) Prior Publication Data

US 2015/0225214 A1    Aug. 13, 2015

(51) Int. Cl.
*B66C 1/00* (2006.01)
*B66C 1/28* (2006.01)
*B60J 7/16* (2006.01)

(52) U.S. Cl.
CPC . *B66C 1/28* (2013.01); *B60J 7/1607* (2013.01)

(58) Field of Classification Search
CPC ..................................... B66F 7/26; B66C 1/28
USPC ........ 294/67.22, 67.33, 74, 67.1, 67.21, 67.5, 294/81.3, 81.5; 254/47, 338; 414/543, 462, 414/626
See application file for complete search history.

(56) References Cited

U.S. PATENT DOCUMENTS

| | | | | |
|---|---|---|---|---|
| 1,512,149 A * | 10/1924 | Wagner | ....................... | 294/82.11 |
| 4,248,469 A * | 2/1981 | Knox | ......................... | 294/82.12 |
| 4,576,542 A | 3/1986 | Brasell | | |
| 4,899,985 A * | 2/1990 | Good | ............................. | 254/8 B |
| 5,081,775 A * | 1/1992 | Veilleux | .......................... | 37/197 |
| 5,782,459 A * | 7/1998 | Klann | ........................... | 254/323 |
| 6,152,427 A | 11/2000 | Hoslett | | |
| 6,357,810 B1 * | 3/2002 | Schwulst | ..................... | 294/81.3 |
| 7,004,697 B2 * | 2/2006 | Alaweih | ......................... | 410/68 |
| 7,568,678 B2 | 8/2009 | Hammond | | |
| 8,556,311 B1 * | 10/2013 | Lucero | ........................ | 294/67.33 |
| 8,641,355 B2 * | 2/2014 | Pawlak | .......................... | 414/462 |
| 9,016,741 B1 * | 4/2015 | Thoreson et al. | ............. | 294/67.1 |
| 2006/0261320 A1 * | 11/2006 | Crawford | ...................... | 254/134 |
| 2007/0163982 A1 * | 7/2007 | Lichinchi | ...................... | 212/175 |
| 2009/0309079 A1 | 12/2009 | Lacina | | |
| 2013/0280020 A1 * | 10/2013 | O'Brien et al. | ............... | 414/543 |

FOREIGN PATENT DOCUMENTS

WO    2007130062    11/2007

OTHER PUBLICATIONS

Installation Instruction/Hoist-a-Top 2 Door JK.
Installation Instruction/Hoist-a-Top 4 Door JK.

* cited by examiner

*Primary Examiner* — Paul T Chin
(74) *Attorney, Agent, or Firm* — Maschoff Brennan

(57) ABSTRACT

A removable vehicle top lift system is disclosed herein. Described embodiments of a removable vehicle top lift system include a T-shaped body includes adjustable left, right, and rear arms that may be adjusted to accommodate the size of different removable vehicle tops. The left, right, and rear arms also include hooks for engaging a removable vehicle top. Balancing mechanisms for a removable vehicle top lift system are disclosed. Hooks with mechanisms to hold down a window of a removable vehicle top are also disclosed.

17 Claims, 17 Drawing Sheets

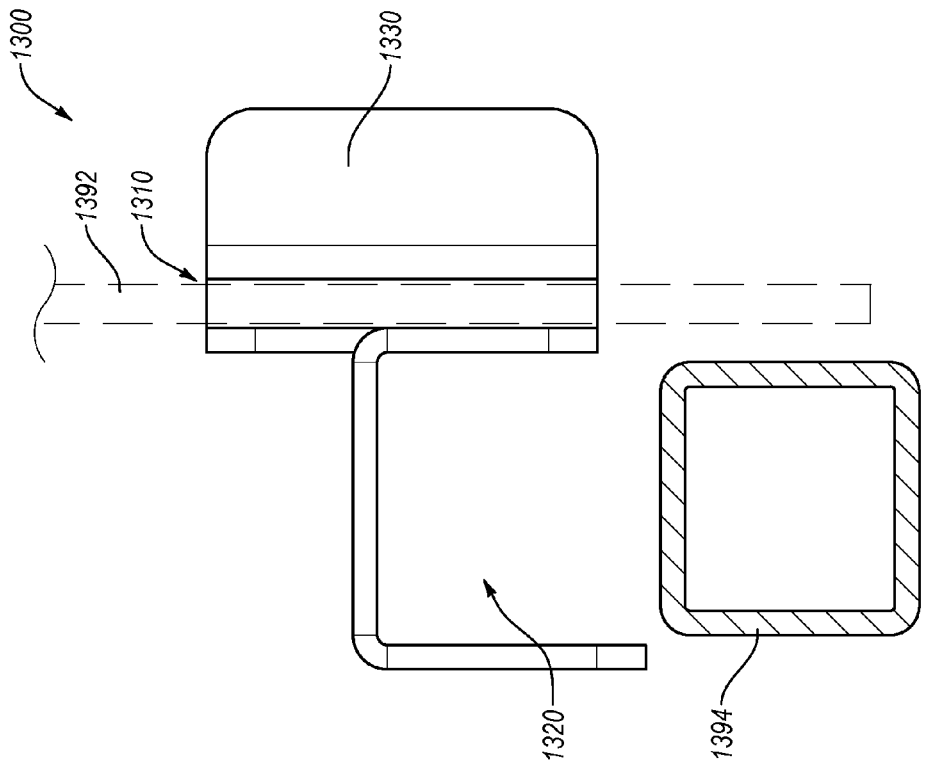
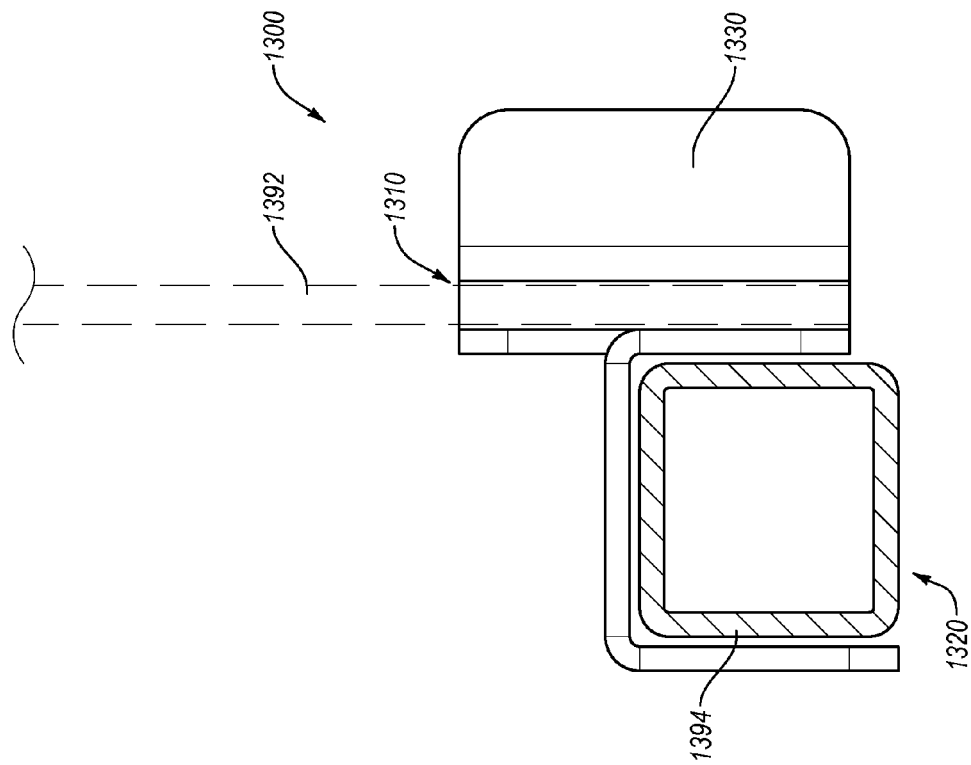

REMOVABLE VEHICLE TOP LIFT SYSTEM

BACKGROUND OF THE INVENTION

1. The Field of the Invention

The present invention relates generally to removable vehicle tops, and more particularly, to a system for removal, attachment, or storage of a removable vehicle top.

2. The Relevant Technology

Passenger, utility, and other vehicles typically include an enclosed cabin in which the vehicle occupants may sit while traveling in the vehicle. The enclosure protects passengers from the wind, weather, and other elements that may be undesirable while operating a vehicle. However, at times passengers may wish to remove portions of the enclosure to enjoy favorable weather, to have greater visibility of the environment surrounding a vehicle, or for other reasons. Accordingly, some vehicles include removable tops that allow vehicle owners to remove part of the enclosure, typically the top, rear, sides, or any combination thereof. Vehicle owners may then selectively remove a vehicle's top, for example, during favorable weather or seasons, and then replace the vehicle top, for example during unfavorable weather or stormy seasons.

Removable vehicle tops come in a variety of shapes and sizes. The shape and size of a removable vehicle top may be dependent on the shape and size of the underlying vehicle. Some removable vehicle tops are rigid to provide strength and extra protection from adverse weather, others removable tops may be constructed of flexible materials. Some removable vehicle tops are removable as a unitary piece, and others are removable in multiple pieces. A removable vehicle top may have any combination of these characteristics.

Removable vehicle tops may often be bulky and heavy such that it is a challenge for vehicle owners to easily remove, reattach, or store the removable vehicle tops for their vehicles. What is needed is a versatile system to assist vehicle owners with the removal, reattachment, and storage of a variety of removable vehicle tops.

BRIEF SUMMARY OF THE INVENTION

This Summary is provided to introduce a selection of concepts in a simplified form that are further described below in the Detailed Description. This Summary is not intended to identify key features or essential characteristics of the claimed subject matter, nor is it intended to be used as an aid in determining the scope of the claimed subject matter.

A removable vehicle top lift system is disclosed herein. In one embodiment a removable vehicle top lift system includes a T-shaped body with a top portion that has a left end and a right end. The left end of the T-shaped body may be selectively coupled to a left arm in at least a first position or a second position. Likewise, the right end of the T-shaped body may be selectively coupled to a right arm in at least a first position or a second position. The T-shaped body also has a distal portion with a proximal end and a distal end. The proximal end of distal portion of the T-shaped body is coupled to the top portion of the T-shaped body and the distal end of the distal portion of the T-shaped body may be selectively coupled to a rear arm. The left arm of the removable vehicle top lift system has a proximal end that may be selectively coupled to the left end of top portion of the T-shaped body. The left arm also has a distal end that includes a left hook for engaging a removable vehicle top. Likewise, the right arm of the removable vehicle top lift system has a proximal end that may be selectively coupled to the right end of top portion of the T-shaped body. The right arm also has a distal end that includes a right hook for engaging a removable vehicle top. The rear arm of the removable vehicle top lift system has a proximal end, which may be selectively coupled with the distal portion of the T-shaped body, and has a distal end with a rear hook for engaging a removable vehicle top.

Various mechanisms to assist in balancing a removable vehicle top lift system are also disclosed. In one embodiment, a balance mechanism may be a slide and a locking screw that are configured to slide along a distal portion of a T-shaped body. The locking screw may have an unlocked position in which the slide and locking screw are able to slide along the distal portion of the T-shaped body. The locking screw may also have a locked position in which the slide and locking screw are retained in a fixed position along the distal portion of the T-shaped body. In another embodiment, the balance mechanism may be a fin coupled to a distal portion of a T-shaped body. The fin may be made of a sheet of material with a plurality of holes to which a cable or other lifting mechanism could be attached for lifting the removable vehicle top lift system. In yet another embodiment, the balance mechanism may be a wave-shaped member that extends along a distal portion of a T-shaped body. The wave-shaped member may provide a plurality of points to which a cable or other lifting mechanism could be attached for lifting the removable vehicle top lift system.

A unique rear hook for a removable vehicle top lift system is also disclosed. The rear hook may allow a rear-window of a removable vehicle top to close completely while the removable vehicle top lift system is in use. The rear hook may also include a rear-window hold-down mechanism that is selectively movable between a first position and a second position. In the first position, the hold-down mechanism may keep the rear window of the removable vehicle top closed. In the second position, the hold-down mechanism may allow the rear window of the removable vehicle top to open.

Other mechanisms to keep the windows of a removable vehicle top closed are also disclosed.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

To further clarify the above and other advantages and features of the present invention, a more particular description of the invention will be rendered by reference to specific embodiments thereof which are illustrated in the appended drawings. It is appreciated that these drawings depict only typical embodiments of the invention and are therefore not to be considered limiting of its scope. The invention will be described and explained with additional specificity and detail through the use of the accompanying drawings in which:

FIG. 13A is a side view of a hold-down bracket in a locked position.

FIG. 13B is a side view of a hold-down bracket in a unlocked position.

DETAILED DESCRIPTION OF THE PREFERRED EMBODIMENTS

Exemplary embodiments of removable vehicle top lift systems and components and methods for using the same will now be described with reference to the Figures. The illustrated and described embodiments are exemplary only, and one of skill in the art will recognize many variations of the described embodiments within the scope of the claims.

Figure 1:
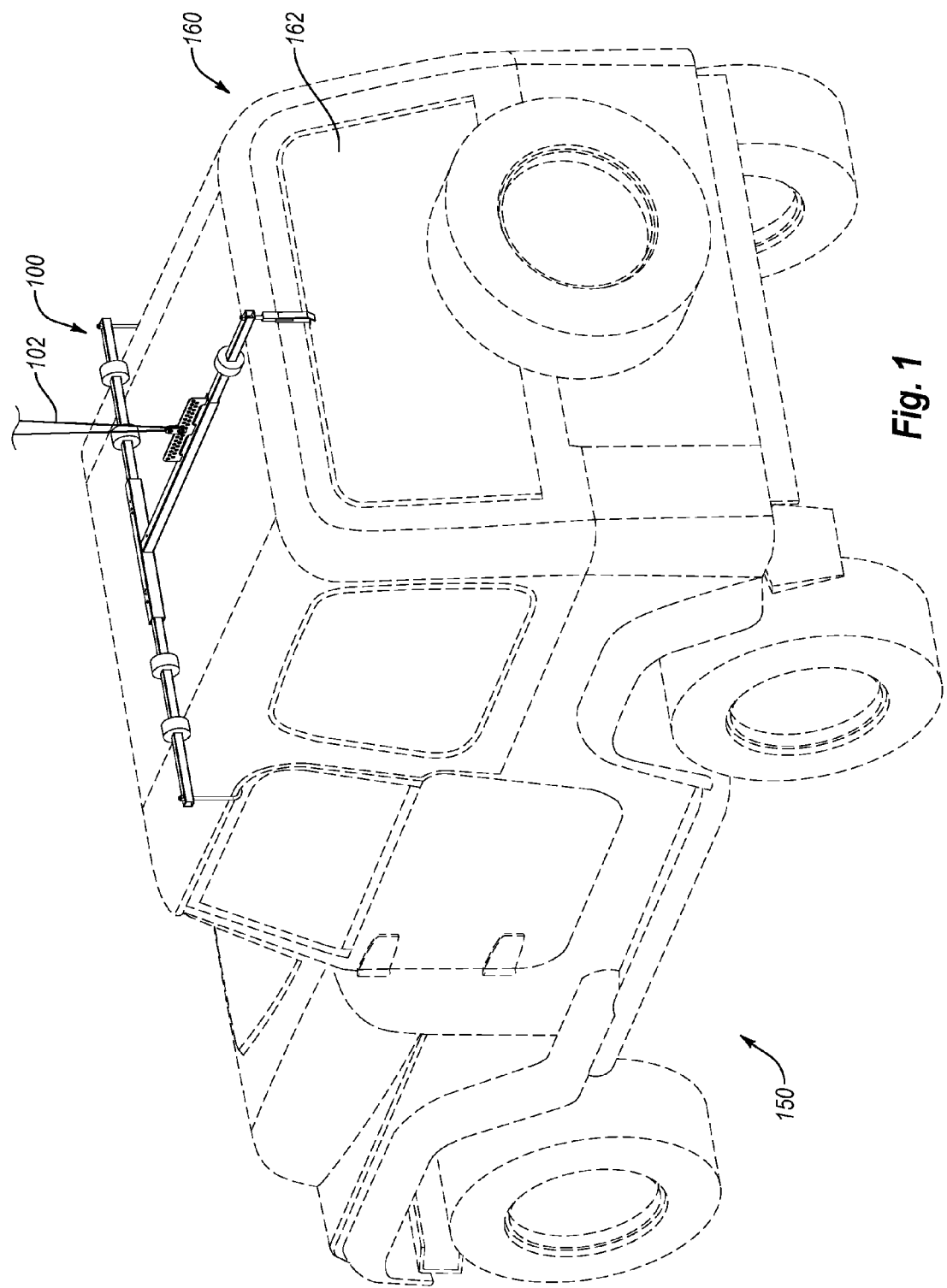
FIG. 1 is a perspective view of a removable vehicle top lift system attached to a removable vehicle top of a utility vehicle, the vehicle and its removable top being shown in phantom lines.

With reference first to FIG. 1, FIG. 1 shows one embodiment of a removable vehicle top lift system 100, which is shown engaging a removable vehicle top 160 of a vehicle 150. The vehicle 150 in FIG. 1 is a utility vehicle. However, a removable vehicle top lift system may be used with any type of vehicle, including, but not limited to, passenger vehicles, sports vehicles, utility vehicles, compact vehicles, vans, buses, boats, watercraft, and other vehicles, whether motorized or manually propelled.

As will be further described herein, the removable vehicle to lift system may be attached, via hooks or other engagement mechanisms, to a removable vehicle top. The removable vehicle top lift system 100 is shown, in FIG. 1, engaging the removable vehicle top 160 of vehicle 150. The removable vehicle top 160 may be connected to vehicle 150 through clips, latches, pins, or other attachment devices. The exact attachment mechanisms for attaching a removable vehicle top to a vehicle may depend on the vehicle manufacturer, the removable top manufacturer, or attachment mechanisms provided by a user of the vehicle. The attachment mechanisms, if any, for removable vehicle top 160 may be disengaged so that the removable vehicle top 160 may be freely moved away from vehicle 150.

A cable 102 is attached to removable vehicle top lift system 100. The cable may be used to raise the removable vehicle top lift system 100 and the removable vehicle top 160 up and away from vehicle 150. The cable 102 may be attached to removable vehicle top lift system 100 directly, or may be attached through the use of pulley mechanisms, carabineers, bolts, pins, or other fasteners to removable vehicle top lift system 100. In other embodiments, the cable 102 may be a wire, rope, belt, or strap. In yet other embodiments, cable 102 may be replaced by a rigid member, such as a rod. The selection of a cable or other structure used to lift removable vehicle top lift system will depend on a particular application.

The cable 102 may also be connected to a gear system to assist in the raising and lowering of cable 102 with removable vehicle top lift system 100. For example, in some embodiments, cable 102 may be connected to a hand operated worm gear, spur gear, or sprocket gear system. In other embodiments, cable 102 may be connected to an electronic gear system. In yet other embodiments, cable 102 may be connected to a ratchet, winch, or hoist. Any variety of pulleys, cables, gears, ratchets, and other such apparatus known to those of skill in the art may be used to assist with the raising of removable vehicle top lift system 100 away from vehicle 150.

Removable vehicle top 160 is shown with a rear window 162 that is closed. Rear-window 162 is configured such that it can be opened and closed whether or not the removable vehicle top 160 is attached to vehicle 150. As will be further described with reference to FIGS. 11-13B removable vehicle top lift system 100 may include mechanisms to keep rear window 162 closed while removable vehicle top lift system 100 is attached to removable vehicle top 160. Removable vehicle top 160 is also shown as comprising a unitary structure. However, other removable vehicle tops may include multiple pieces that may need to be disconnected or otherwise unattached from a vehicle to fully remove the removable top.

Figure 2:
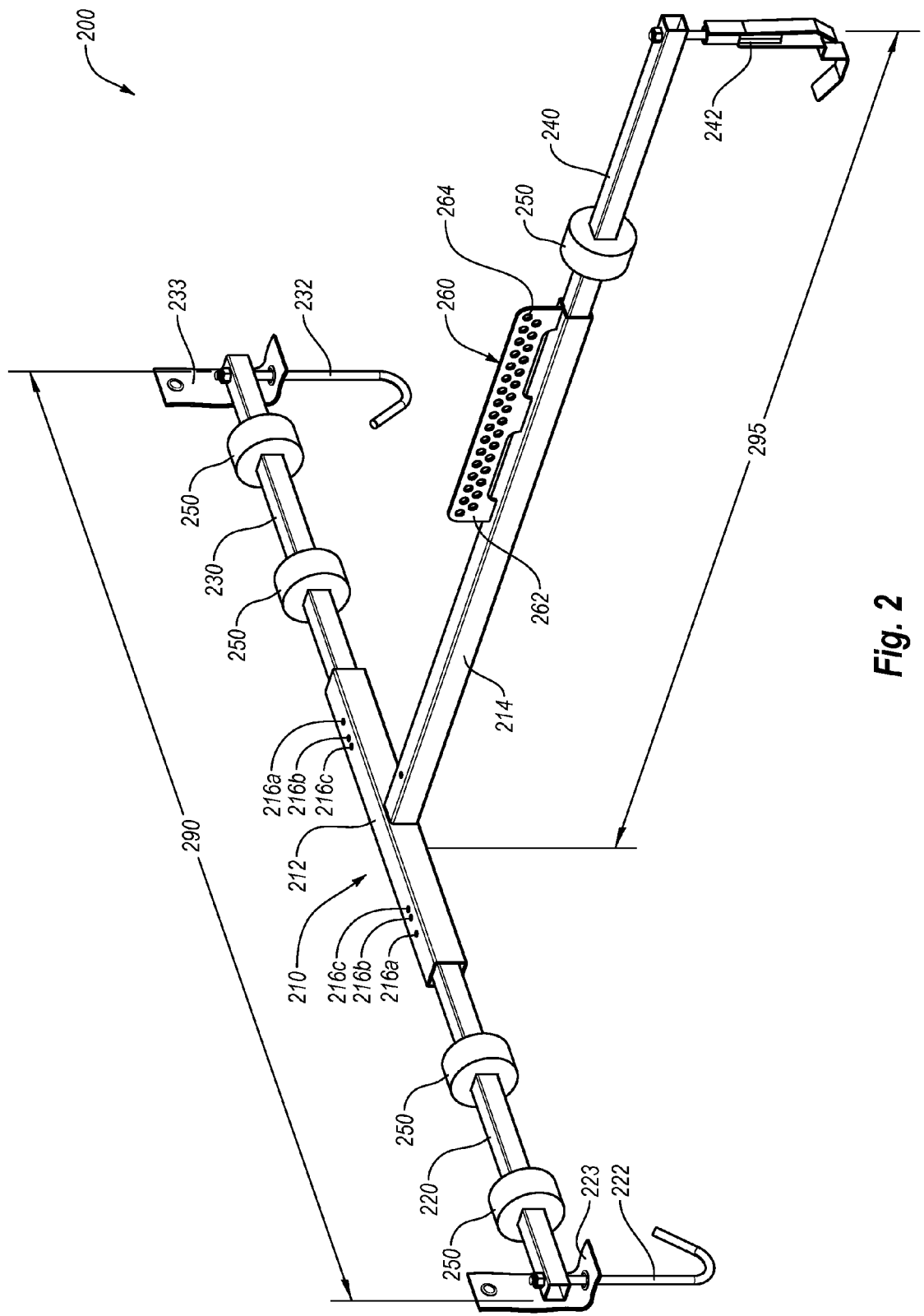
FIG. 2 is a perspective view of a removable vehicle top lift system.

With reference now to FIG. 2, an embodiment of a removable vehicle top lift system 200 is shown in further detail. Removable vehicle top lift system 200 includes T-shaped body 210, left arm 220, right arm 230, and rear arm 240. Removable vehicle top lift system 200 is shown as substantially T-shaped. However, other shapes for a removable vehicle top lift system may be used. Removable vehicle top lift system 200 is also show as being made primarily of metal components. In other embodiments, the components of a removable vehicle top lift system may be made from any combination of metals, plastics, PVC, composite materials, or any other material known to those of skill in the art to be of sufficient character to lift and hold a removable vehicle top.

T-shaped body 210 includes a top portion 212 and a distal portion 214. The top portion 212 and distal portion 214 may be a single component or may be comprised of multiple components that are joined together through the use of fasteners. Top portion 212 and distal portion 214 are shown as having a substantially square tube shape; however, round tubing or any combination of shapes may be used for top portions and distal portions of a T-shaped body.

The top portion 212 includes a left side, in which left arm 220 is inserted, and a right side, in which right arm 230 is inserted. Top portion 212 also includes holes 216a, 216b, and 216c. Holes 216a-c may be used to adjust the depth to which left arm 220 and right arm 230 are inserted into top portion 212.

Figure 2A:
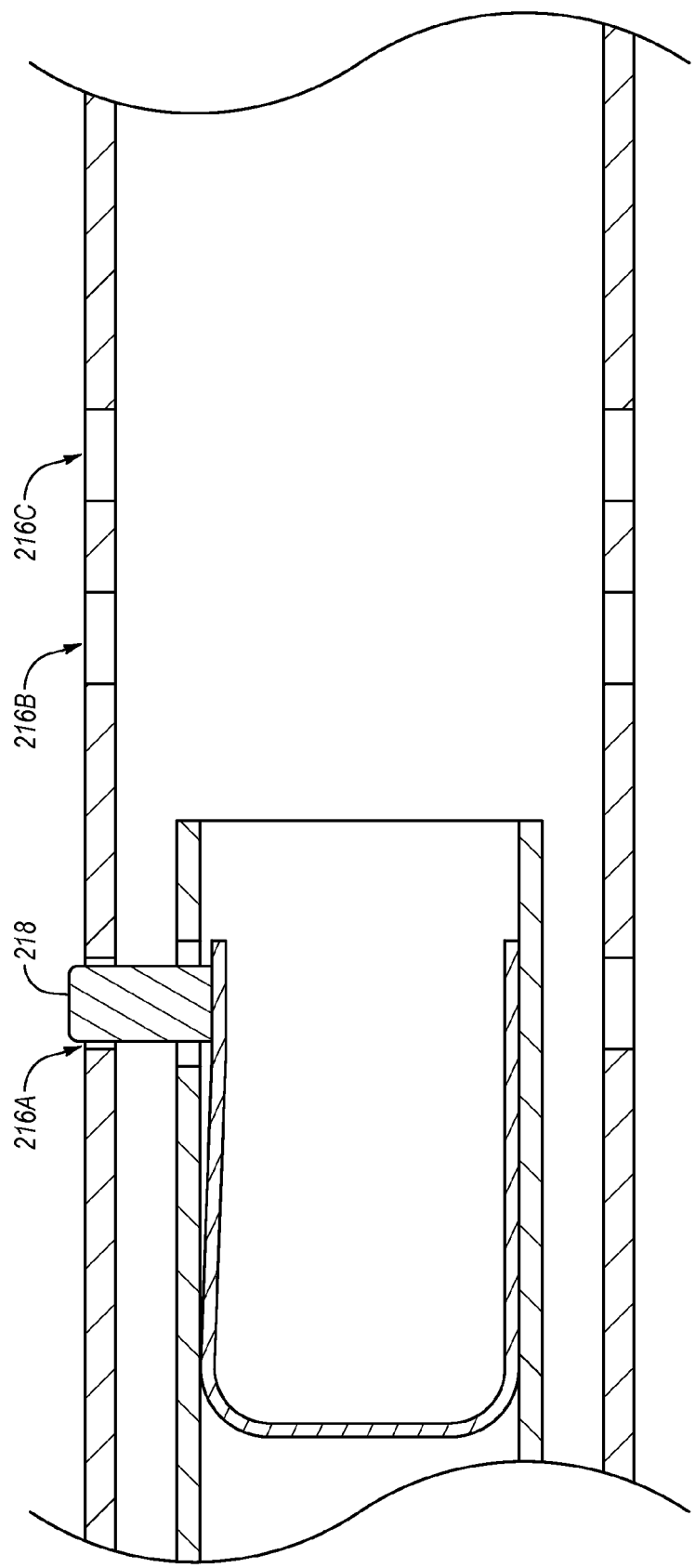
FIG. 2A is a side view of a depressible push button connecter for use with a removable vehicle top lift system.

For example, and as shown in FIG. 2A, left arm 220 includes a depressible push pin 218 on the end that is inserted into the left side of top portion 212. The depressible push pin 218 of left arm 220 may engage one of the holes 216a to lock the left arm 220 in a first position with respect to top portion 212. A user may then depress the depressible push pin 218 to further insert the left arm 220 into top portion 212 to a depth at which the depressible push pin 218 of the left arm 220 engages a hole 216b of the top portion 212, which may be referred to as a second position of left arm 220 with respect to top portion 212. A user may then depress the depressible push pin 218 of left arm 220 yet again to further insert the left arm 220 into top portion 212, to a third position, at which the depressible push pin 218 on the left arm 220 engages a hole 216c of the top portion 212. Right arm 230 also includes a depressible push pin 218 and may be set into a first position, second position, or third position in a similar manner. In this way the width 290 of removable vehicle top lift system 200 may be adjusted. As will be described further with reference to FIGS. 3A and 3B, the rear arm may also be adjusted through the use of similar mechanisms in order to adjust the length 295 of removable vehicle top lift system 200.

The holes 216a-c of top portion 212 may be placed in predetermined positions to fit the sizing of a particular removable vehicle top or a plurality of removable vehicle tops. Alternatively, the holes may be placed at standard increments. For example, the holes of a top portion may be placed every one inch along the top portion. In this way the same removable vehicle top list system may be sized and configured to fit any number of removable vehicle tops.

While the left arm 220 and the right arm 230 include a depressible push pin mechanism for adjusting the width of removable vehicle top lift system 200, other fasteners or mechanisms may be used. For example, in another embodiment, a pin may inserted through a hole of a top portion and through a left or right arm in order to secure the left or right arm in a first position. The pin may then be removed to move the left or right arm to a different depth in top portion such that the pin may be inserted in a different hole of the top portion and through the left or right arm to secure the left or right arm in a second position. Any other number of fasteners may be used to secure left or right arms to a top portion at various positions. For example, screws, bolts, pins, ties, or other fasteners may be used to selectively secure left or right arms to a top portion at various positions.

Left arm 220 includes a hook 222 and spacers 250. The hook 222 may be attached to left arm 220 thought the use of any type of fastener known to those of skill in the art. The hook 222 is a threaded hook that is inserted through left arm 220 and secured with a nut, which engages the threaded portion of hook 222. Hook 222 is used to engage and attach at least a portion of a removable vehicle top to the removable vehicle top lift system 200. Therefore, hook 222 may include padding, such as rubber coating, to protect a removable vehicle top from damage that could be caused if an unpadded hook were used to engage a removable vehicle top. Hook 222 is a metal hook; however any suitable material may be used for a hook 222, such as metal, plastic, PVC, composite materials, or other material of sufficient strength. Hook 222 is also shown as a J-shaped hook. However, any shape of hook may be used for hook 222. In other embodiments an L-shaped hook may be used. A strap 223 may also be provided with hook 222 to provide an attachment point for cables, bungee cords, or rope for use with removable vehicle top lift system 200. For example, the strap 223 includes two grommets or eyelets to which hooks, cords or other attachment mechanisms may be attached. In other embodiments, hook 222 also may include an eyelet through the hook, which may be used to attached cables, bungee cords, rope, or other hooks for use with removable vehicle top lift system 200.

Left arm 220 also includes spacers 250. Spacers 250 may be foam, rubber, plastic, or other material to provide separation between the left arm 220 and a removable vehicle top while the removable vehicle top lift system 200 is in use.

Right arm 230 includes a hook 232, which is substantially similar to the hook 222. Hook 232 may also be accompanied by a strap 233, which is substantially similar to the strap 223. Right arm 230 also include spacers 250 that provide separation between the right arm 230 and a removable vehicle top while the removable vehicle top lift system 200 is in use.

The distal portion 214 of T-shaped body 210 is shown perpendicular to and extending away from top portion 212. Rear arm 240 is inserted into a distal end of distal portion 214. The rear arm 240 may be configured similar to the configuration of the left arm 220 or right arm 230. For example, the rear arm 240 may also include a depressible push pin that may be used to selectively adjust the depth at which rear arm 240 is secured to distal portion 214.

Rear arm 240 also includes a hook 242. Hook 242 is configured to engage with the rear window portion of a removable vehicle top. However, a hook similar to hook 222 or hook 232 may be used instead of hook 242. Hook 242 will be further described with reference to FIGS. 11, 12A, and 12B. Rear arm 240 also includes a spacer 250 to provide separation between the rear arm 240 and a removable vehicle top while the removable vehicle top lift system 200 is in use.

While left arm 220 and right arm 230 are shown with two spacers 250 on each arm, any number of spacers, or no spacers, may be used. Likewise, any number of spacers 250, or no spacers, may be used in connection with rear arm 240.

Distal portion 214 of T-shaped body 210 also includes a balancing mechanism 260. In the embodiment of FIG. 2, balancing mechanism 260 includes a fin 262 that extends along a portion of the length of distal portion 214. The fin 262 of balancing mechanism 260 includes a plurality of holes 264. As described with respect to FIG. 1, a user of removable vehicle top lift system 200 may attach a cable or other lifting mechanism to the balancing mechanism 260 of removable vehicle top lift system 200 in order to lift the removable vehicle top lift system 200 away from a vehicle.

When a removable vehicle top is attached to removable vehicle top lift system 200 the removable vehicle top may be unbalanced due to an imbalance of weight of the removable vehicle top or due to other factors. A user may attach a cable or other lifting mechanism to removable vehicle top lift system 200 by attaching the cable or other lifting mechanism to any one of holes 264 of the balancing mechanism 260. If the removable vehicle top lift system 200 with removable vehicle top is unbalanced toward the rear such that rear arm 240 tends to drop below the top portion 210 of the removable vehicle top lift system 200, then a user may attached a cable or other lifting mechanism to a hole 264 of the balancing mechanism 260 that is towards the rear arm 240. On the other hand, if the removable vehicle top lift system 200 with removable vehicle top is unbalanced toward the front such the top portion 210 tends to drop below the rear arm 240 of the removable vehicle top lift system 200, then a user may attached a cable or other lifting mechanism to a hole 264 of the balancing mechanism 260 that is towards the top portion 210. In this way the user can select a hole 264 of the balancing mechanism 260 that provides a desirable balance between the front and rear of the removable vehicle top lift system such that top portion 210 and rear arm 240 are substantially planer while in use.

While balancing mechanism 260 is described as adjusting the front-to-rear balance of a removable vehicle top lift system, other balancing mechanisms may be used that adjust the side-to-side or overall balance of a removable vehicle top lift system. Therefore, the balancing mechanisms disclosed herein should not be understood as limited to the disclosed embodiments but may be used in other ways to adjust the balance of a removable vehicle top lift system.

Figure 3:
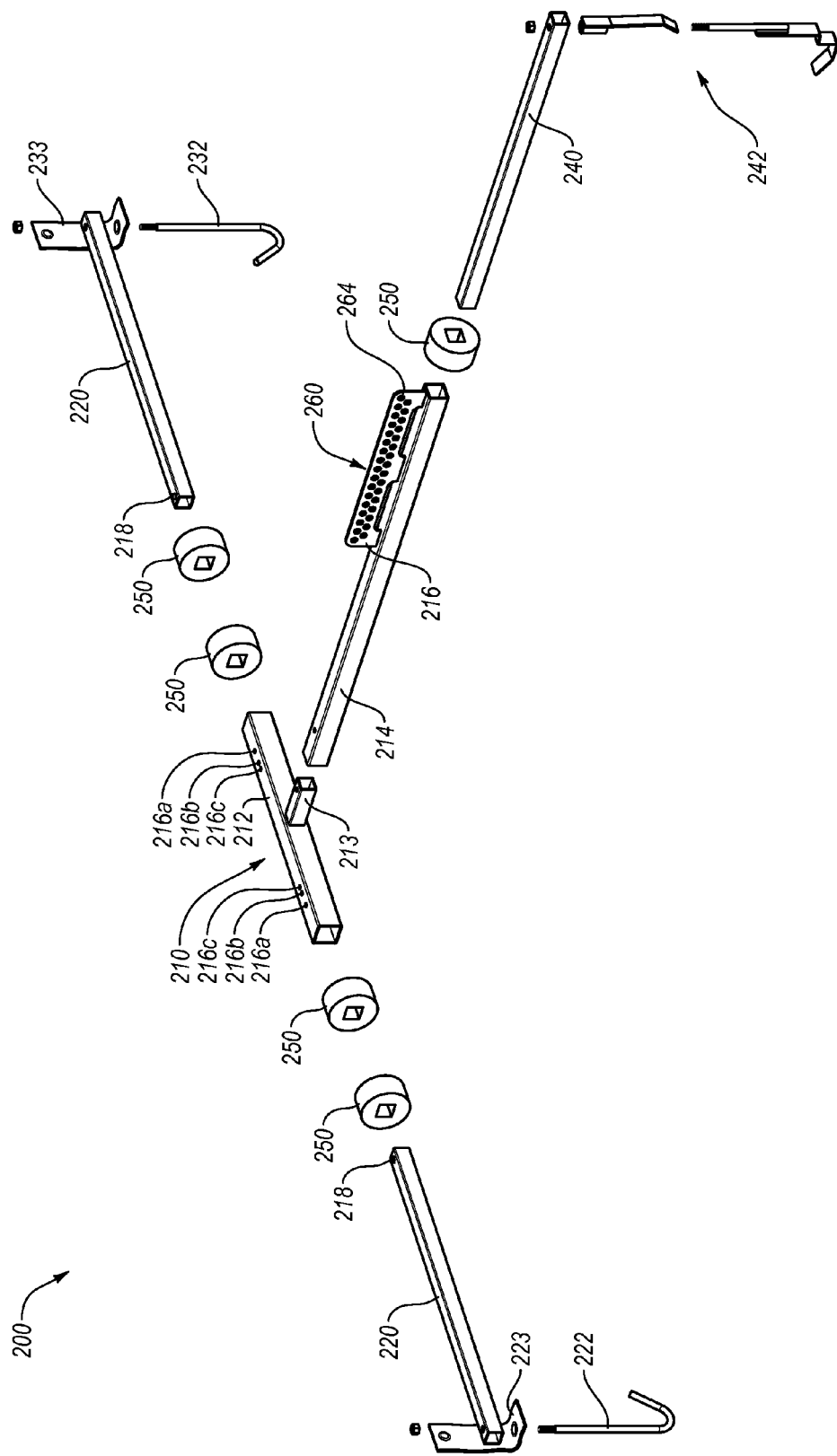
FIG. 3 is a perspective, exploded view of a removable vehicle top lift system.

FIG. 3 is an exploded view of removable vehicle top lift system 200. FIG. 3 further shows that top portion 212 and distal portion 214 of T-shaped body 210 may be comprise of multiple pieces. As shown in FIG. 3, top portion 212 further includes and extension 213 that is inserted into and end of distal portion 214. Top portion 212 may then be secured to distal portion 214 through the use of a fastener inserted through distal portion 214 and extension 213. Top portion 212 may be fastened to distal portion 214 by a pin, depressible push button fastener, rivet, screw, bolt, tie, or other fastener known to those of skill in the art.

Figure 3A:
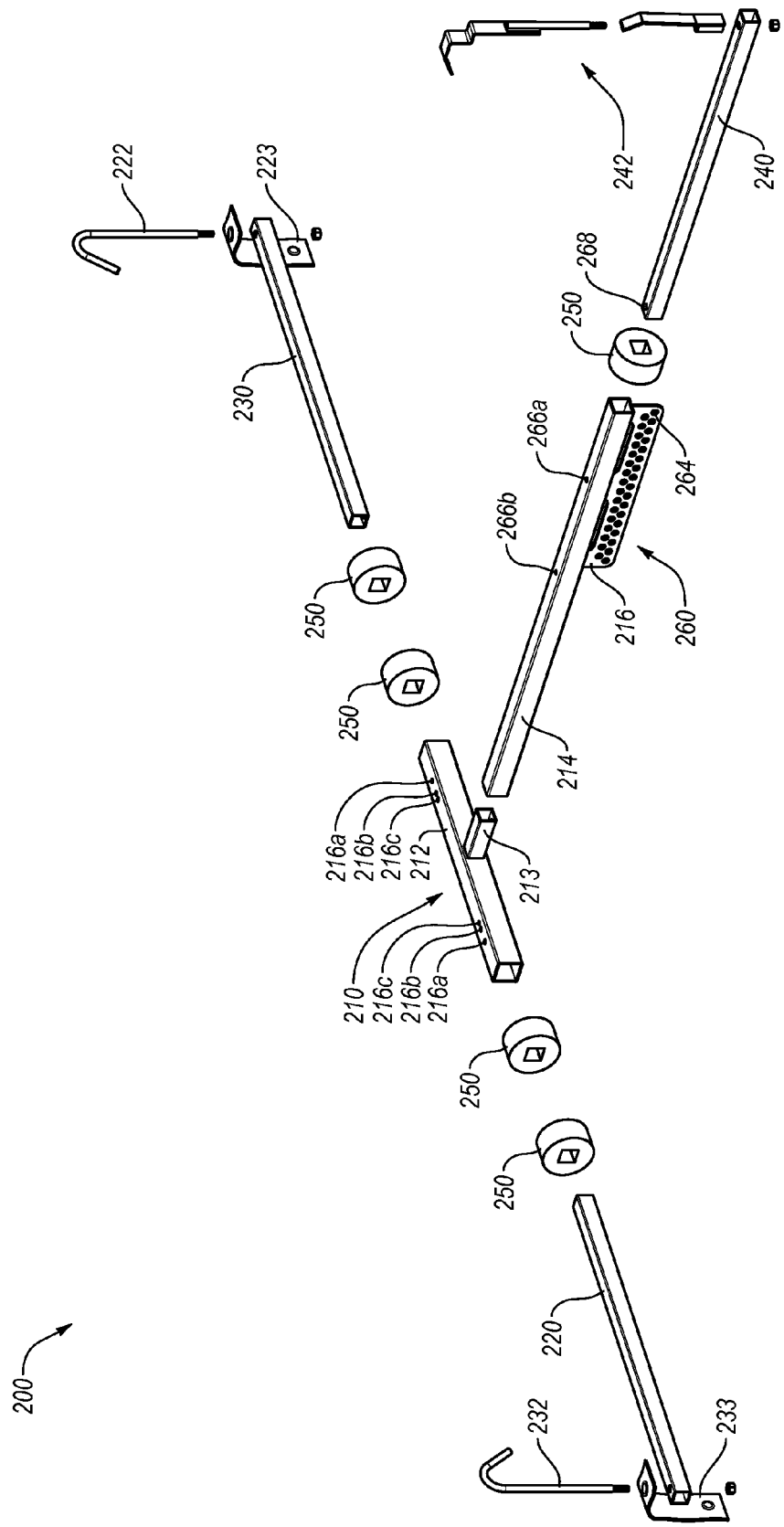
FIG. 3A is a perspective, exploded view of the underside of a removable vehicle top lift system.

FIG. 3A is another exploded view that shows the underside of removable vehicle top lift system 200. As can be seen in FIG. 3A, the rear arm 240 includes a depressible push pin 268 that engages with holes 266a-b on distal portion 214 of T-shaped body 210. The depressible push pin 268 may engage hole 266a to lock the rear arm in a first position with respect to distal portion 214. A user may then depress the depressible push pin 268 to further insert the rear arm 240 into distal portion 214 to a depth at which the depressible push pin 268 of the rear arm 240 engages hole 266b of the distal portion 214, which may be referred to as a second position of rear arm 240 with respect to distal portion 214. In this way the length 295 of removable vehicle top lift system 200 may be adjusted.

The holes 266a-b of distal portion 214 may be placed in predetermined positions to fit the sizing of a particular removable vehicle top or a plurality of removable vehicle tops. Alternatively, the holes may be placed at standard increments. For example, the holes of a distal portion may be placed every one inch along the distal portion. In this way the same removable vehicle top list system may be sized and configured to fit any number of removable vehicle tops.

Figure 4:
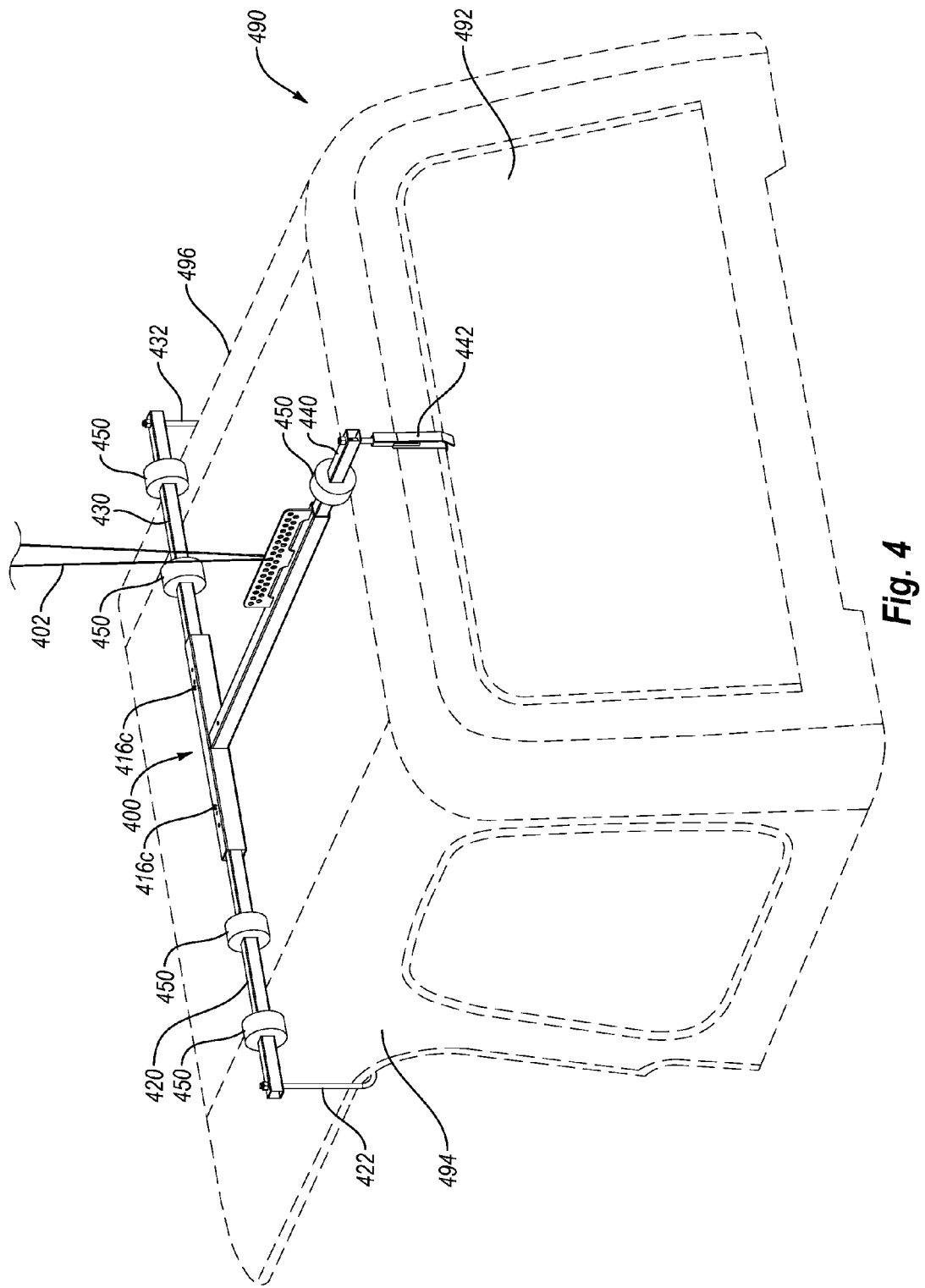
FIG. 4 is a perspective view of a removable vehicle top lift system, wherein the left and right arms are in a first position.

FIG. 4 shows a removable vehicle top lift system 400 attached to a removable vehicle top 490. The vehicle top 490 has a left side 494, a right side 496, and a rear window 492. The hook 422 is shown engaging a portion of the left side 494 of vehicle top 490. Likewise, the hook 432 is shown engaging a portion of the right side 496 of the vehicle top 490. Rear hook 442 is engaged with vehicle top 490 at the rear window 492 of vehicle top 490. Hooks 422, 432, and 442 engage vehicle top 490 to lift it when the removable vehicle top lift system 400 is lifted by cable 402.

Left arm 420 and right arm 430 of removable vehicle top lift system 400 are shown in a first position to accommodate the width of removable vehicle top 490. The depressible push pins of the left arm 420 and the right arm 430 are in engagement with the holes 416c to retain the left arm 420 and the right arm 430 in the first position. The spacers 450 provide padding and protection against damage that otherwise could be caused by removable vehicle top lift system 400 directly contacting removable vehicle top 490 during use of removable vehicle top lift system 400.

Figure 5:
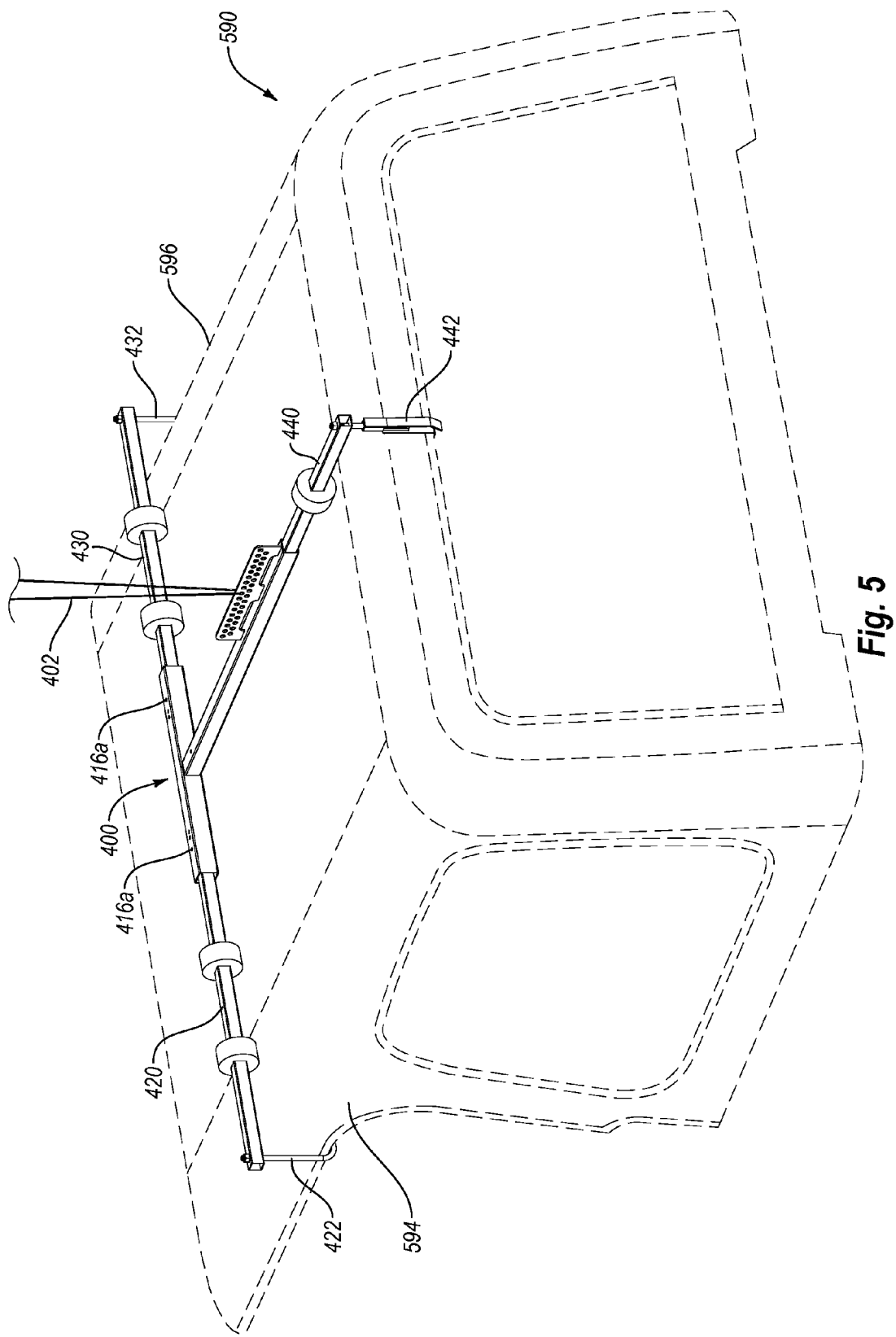
FIG. 5 is a perspective view of a removable vehicle top lift system, wherein the left and right arms are in a second position.

FIG. 5 shows a removable vehicle top 590 that is wider than the removable vehicle top 490 of FIG. 4. The width of removable vehicle top lift system 400 has been adjusted by depressing push pins on left arm 420 and on right arm 430 to move the left arm 420 and the right 430 to engage with holes 416a. Left arm 420 and right arm 430 are thus maintained in a second position. By adjusting the width of removable vehicle top lift system 400 by moving left arm 420 and right arm 430 from a first position to a second position, the removable vehicle top lift system 400 may accommodate the wider removable vehicle top 590. Accordingly, the hook 422 engages a left side 594 of removable vehicle top 590, and hook 432 engages right side 596 of removable vehicle top 590.

Figure 6:
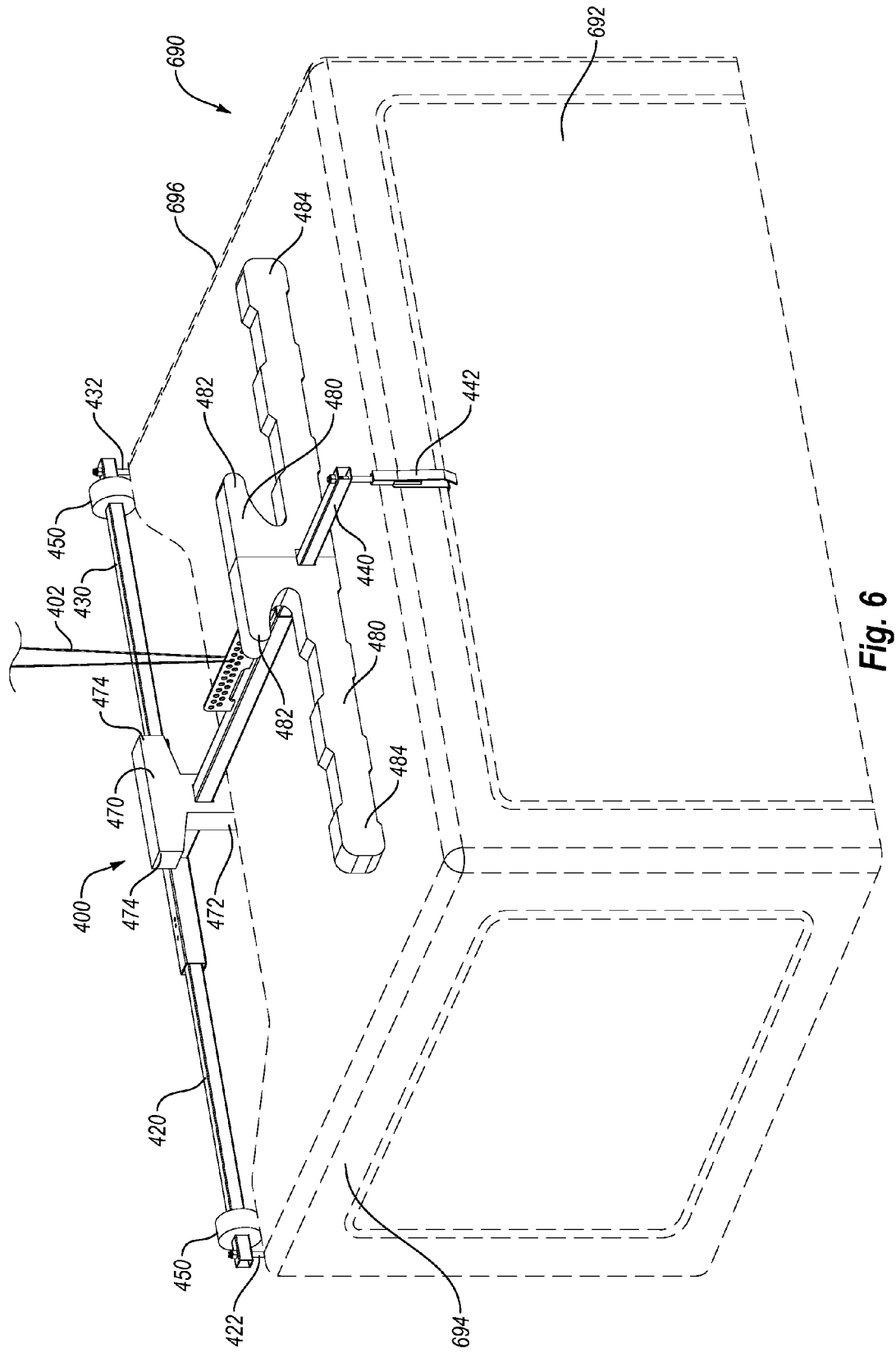
FIG. 6 is a perspective view of a removable vehicle top lift system that is shown with foam components to hold pieces of a removable vehicle top, and with a hold-down mechanism of the rear hook in a second position.

FIG. 6 shows a removable vehicle top lift system 400 attached to a removable vehicle top 690. Removable vehicle top 690 has a left side 694, right side 696, and a rear window 692, but overall has a different configuration than either removable vehicle top 490 of FIG. 4 or removable vehicle top 590 of FIG. 5.

In the embodiment shown in FIG. 6, left arm 420, right arm 430, and rear arm 440 have been adjusted to accommodate the width and length of removable vehicle top 690. Hook 422 engages the left side 694 of removable vehicle top 690, and hook 432 engages the right side 696 of the removable vehicle top 690. Spacers 450 are used to provide space between removable vehicle top 690 and left arm 420 and right arm 430.

An additional spacer 470 is shown in FIG. 6. Spacer 470 shows that spacers, such as spacer 470 or spacers 450, may be of any size and shape to provide space and to hold a removable vehicle top lift system at a desired position with respect to a removable vehicle top. Spacer 470 is shown with a lower flange 472 that extends below the removable vehicle top lift system 400 to contact the top of removable vehicle top 690. The lower flange 472 may sit atop the vehicle top 690 or sit, as shown, further away from the balance mechanism. Lower flange 472 provides padding and protection for removable vehicle top 690. In addition, lower flange 472 of spacer 470 helps prevent removable vehicle top from moving or shifting while attached to removable vehicle top lift system 400.

Spacers 480 are also shown in FIG. 6 for use in connection with removable vehicle top lift system 400. Spacers 480 include top flanges 482 and bottom flanges 484. Spacers 480 provide space between removable vehicle top lift system 400 and removable vehicle top 690. In addition, and as will be further explained with reference to FIG. 7, spacers 480 and spacer 470 provide spaces for additional pieces of removable vehicle top 690 to be stored.

Figure 7:
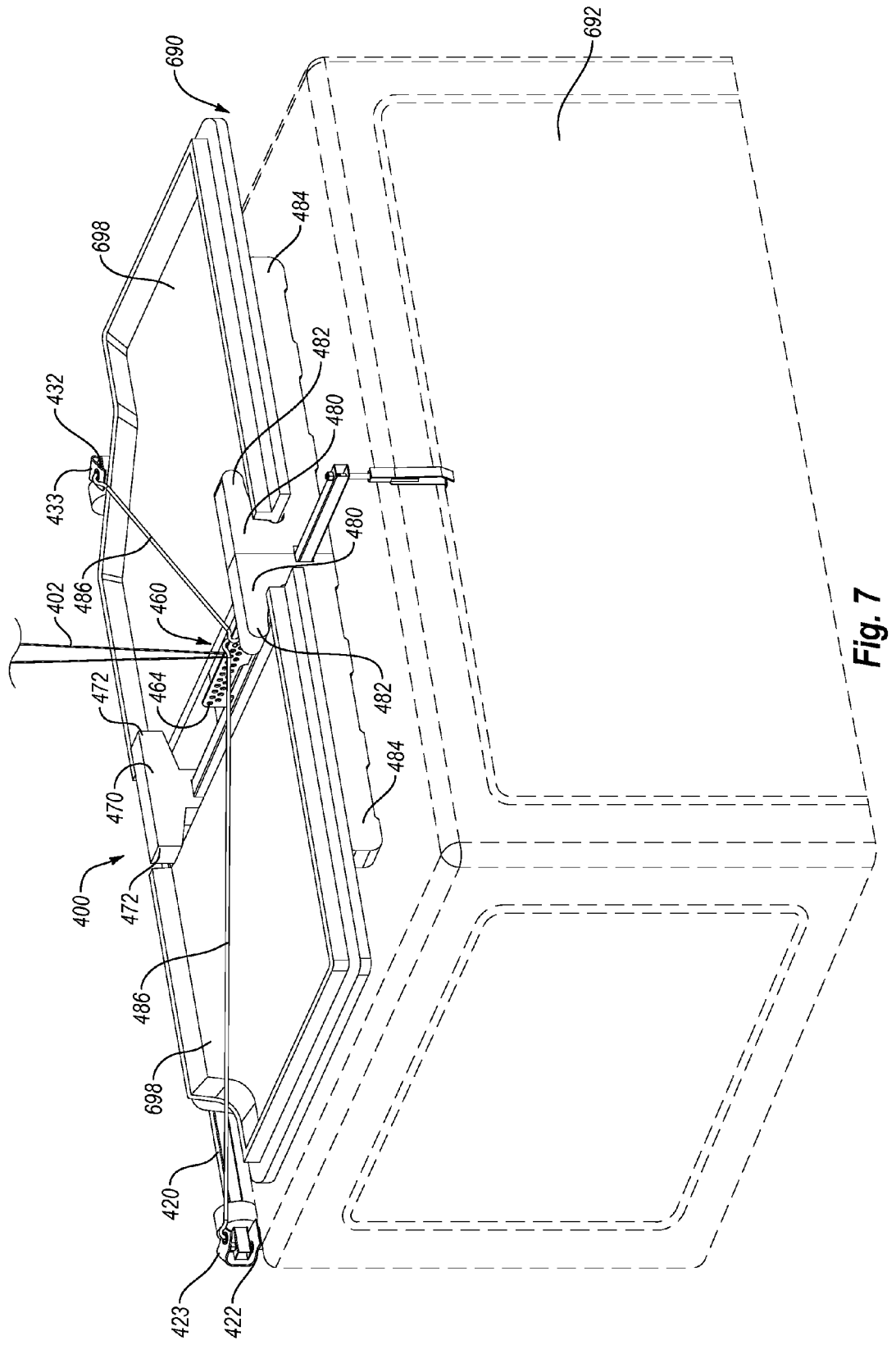
FIG. 7 is a perspective view of the removable vehicle top lift system of FIG. 6, wherein the hold-down mechanism on the rear hook is in a second position.

FIG. 7 shows additional pieces of removable vehicle top 690 stored atop removable vehicle top lift system 400. Removable vehicle top extensions 698 are additional pieces of removable vehicle top 690 such that the entirety of removable vehicle top 690 is not a single piece. Top extensions 698 sit atop the bottom flanges 484 and below the top flanges 482 of spacers 480. Top extensions 698 may also rest atop additional spacers (not shown) or atop spacers 450 disposed on left arm 420 and right arm 430. The top flanges 472 of spacer 470 and the top flanges 482 of spacers 480 help prevent unwanted movement of extensions 698. Cords 486 may also be used to help secure extensions 698 to the removable vehicle top lift system 400. As shown in FIG. 7, hooks on each end of cords 486 may be attached to holes 464 of the balance mechanism 460; to straps 423, 433; or to hooks 422, 433 at any other portion thereof. Thus, additional pieces of removable vehicle top 690 may be removed and stored with removable vehicle top lift system 400.

In alternative embodiments, vehicle accessories or other items may be stored with a removable vehicle top lift system. Spacers and other additions to a removable vehicle top lift system may be sized and configured to hold and store a variety of vehicle accessories or other items.

Figure 8:
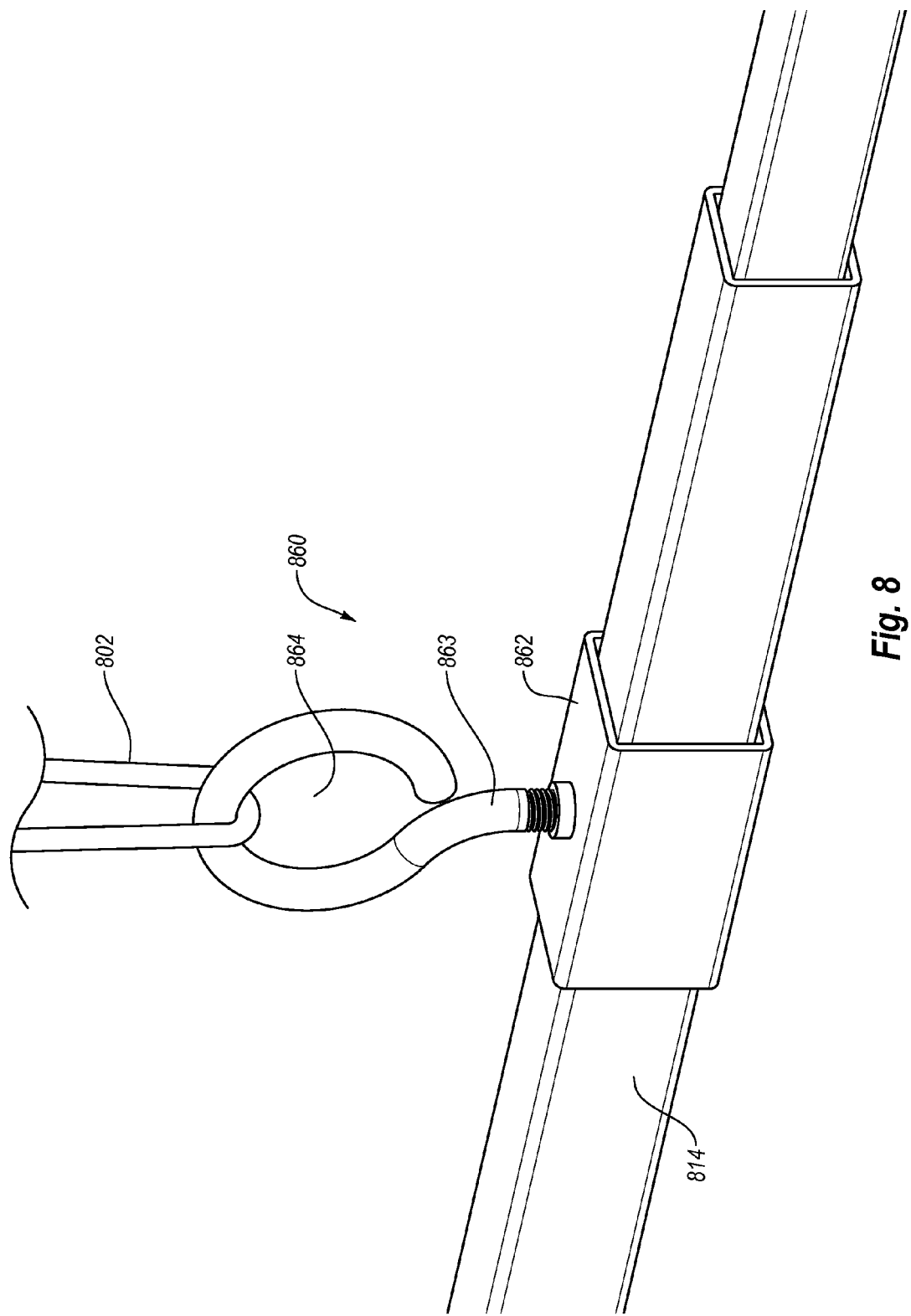
FIG. 8 is a perspective view of one embodiment of a balance mechanism.

FIG. 8 shows one embodiment of a balance mechanism for use with a removable vehicle top lift system. Balance mechanism 860 includes a slide 862 and a locking screw 863. Distal portion 814 of a T-shaped body is inserted through slide 862 such that slide 862 may slide along the length of distal portion 814. Locking screw 863 is threaded through slide 862 so that it may engage distal portion 814. When locking screw 863 is at least partly unscrewed so that locking screw 863 does not engage distal portion 814, slide 862 may freely slide along distal portion 814. When locking screw 863 is screwed into and through slide 862 so that locking screw 863 engages distal portion 814, the ability of slide 862 to slide along distal portion 814 is restricted. Locking screw 863 also includes a loop 864 to which a cable, such as cable 802, or other lifting mechanism may be attached.

Figure 9:
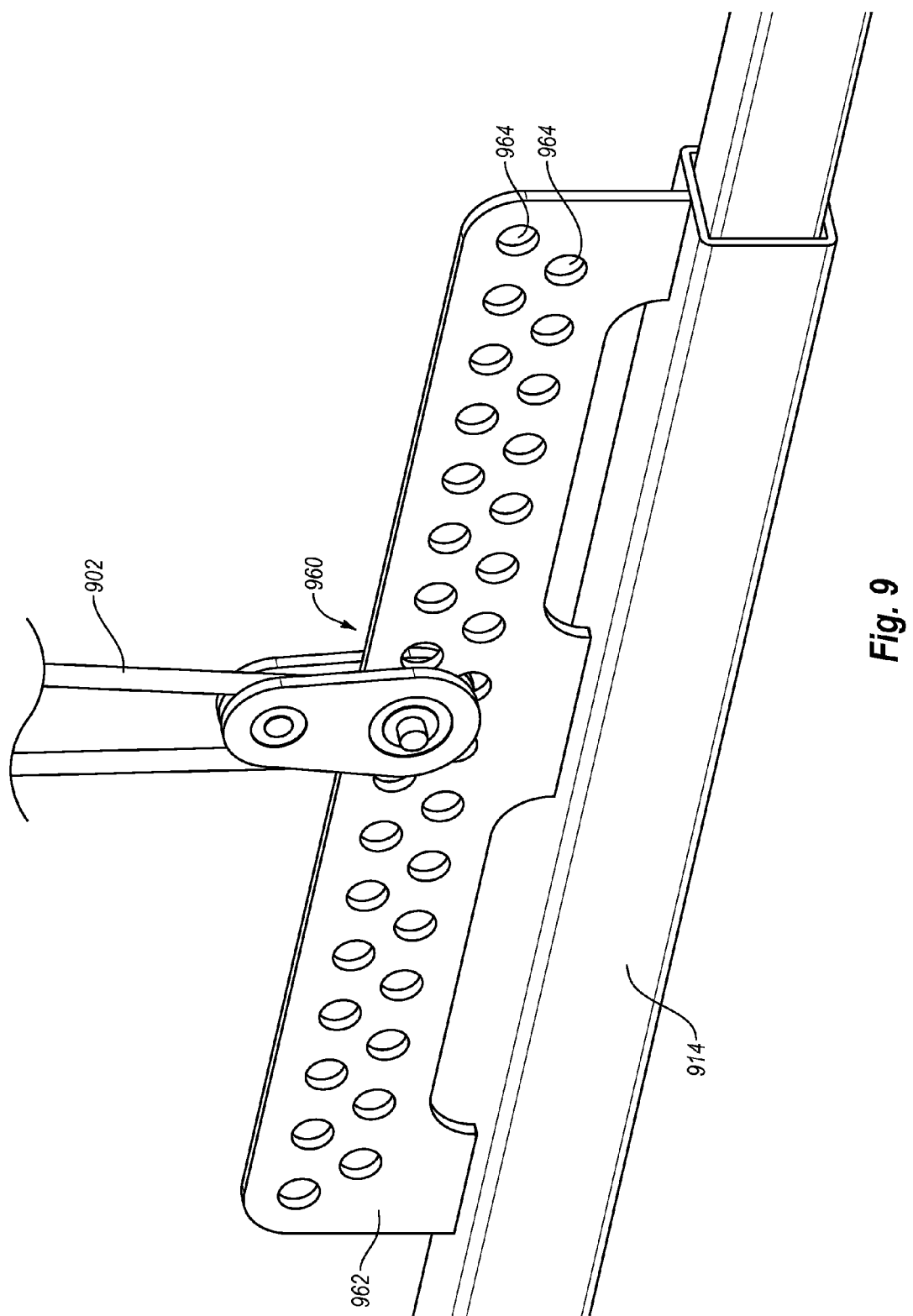
FIG. 9 is a perspective view of another embodiment of a balance mechanism.

As described previously, the user may use a balancing mechanism, such as balancing mechanism 860, to provide a desirable balance between the front and rear of a removable vehicle top lift system. With reference to balancing mechanism 860, a user may slide balancing mechanism 860 along the distal portion 814 to change the position of the connection point at which cable 802 lifts the removable vehicle top lift system FIG. 9 shows another embodiment of a balance mechanism for use with a removable vehicle top lift system. Balance mechanism 960 includes a fin 962 that extends along at least a portion of the length of distal portion 914 of a T-shaped body of a removable vehicle top lift system. The fin 962 of balancing mechanism 960 includes a plurality of holes 964. A user of a removable vehicle top lift system that includes the balancing mechanism 960 may attach a cable 902 or other lifting mechanism to the removable vehicle top lift system in order to lift the removable vehicle top lift system. A user may use balancing mechanism 960 to provide a desirable balance between the front and rear of a removable vehicle top lift system. The user may select any of the holes 964 as a connection point for a cable 902. In this way, the user may select any number of connection positions along the length of distal portion 914 by which to lift a removable vehicle top lift system.

Figure 10:
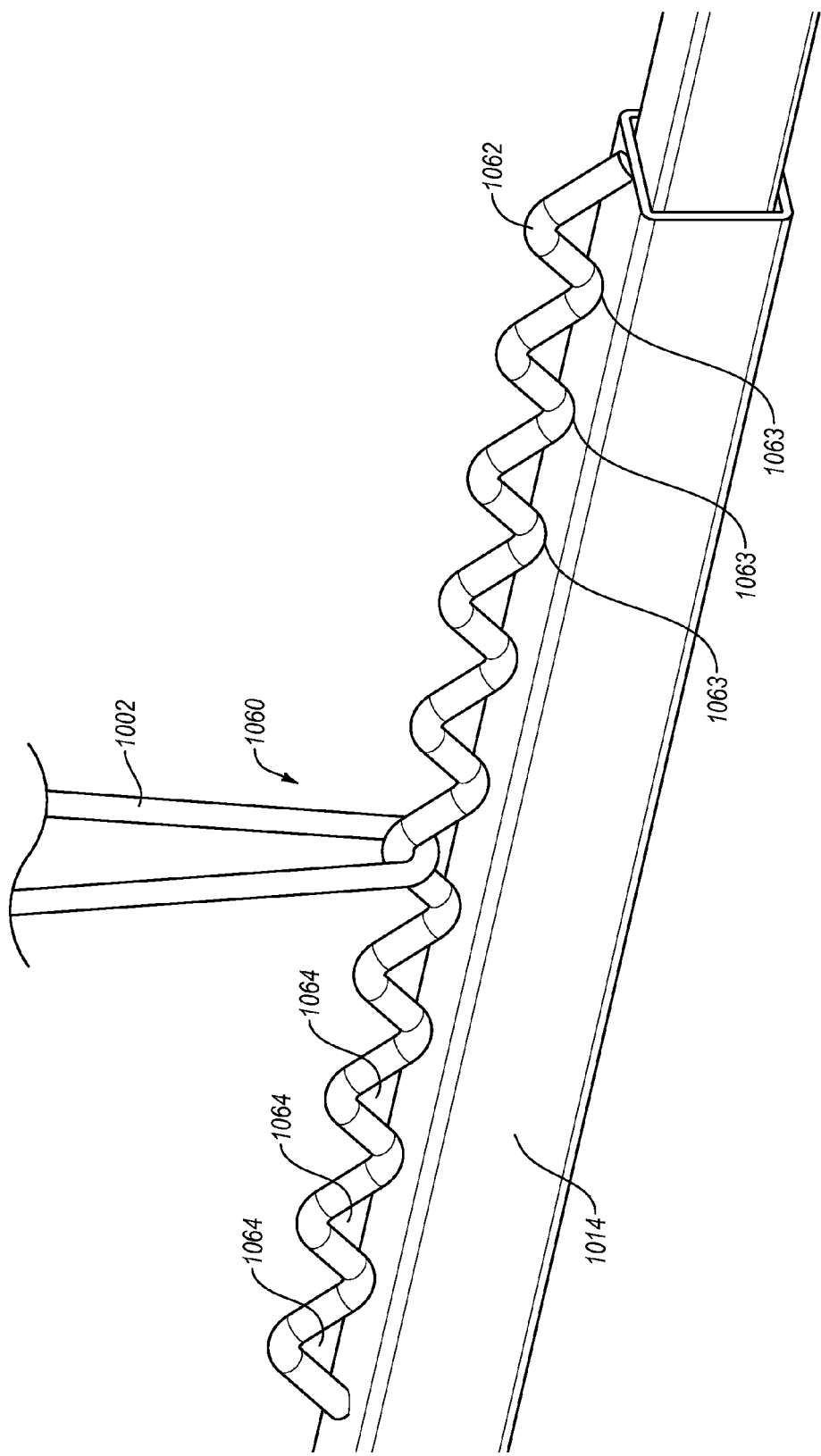
FIG. 10 is a perspective view of yet another embodiment of a balance mechanism.

FIG. 10 shows yet another embodiment of a balance mechanism. Balance mechanism 1060 includes a wave-shaped bar 1062 that extends along distal portion 1014 of a T-shaped body of a removable vehicle top lift system. Wave-shaped bar 1062 is connected to distal portion 1014 at connection points 1063. Wave-shaped bar 1062 may be connected to distal portion through welding, may be integrally formed with distal portion 1014, or may be connected through other suitable means. The shape of wave-shaped bar 1062 and distal portion 1014 define a plurality of cavities 1064 through which a cable 1002 may be connected to lift a removable vehicle top lift system of which balancing mechanism 1060 is a part. A user may use balancing mechanism 1060 to provide a desirable balance between the front and rear of a removable vehicle top lift system. The user may select any of the holes 1064 as a connection point for a cable 1002. In this way, the user may select any number of connection positions along the length of distal portion 1014 by which to lift a removable vehicle top lift system.

One of skill in art will be aware of other means by which a removable vehicle top lift system may be balanced. For example, additional balance may be provided to a removable vehicle top lift system by providing additional connection points by which to lift a removable vehicle top lift system. In some embodiments two cables may be used to lift a removable vehicle top lift system from two points. Any number of lift points along any position of a removable vehicle top lift system may be used and will be apparent to those of skill in the art based on a particular application for a removable vehicle top lift system. Again, the disclosed balancing mechanisms and other balancing mechanisms may be used to adjust the balance of a removable vehicle top lift system front-to-back, side-to-side, or in any other way to adjust the overall balance of a removable vehicle top lift system.

Figure 11:
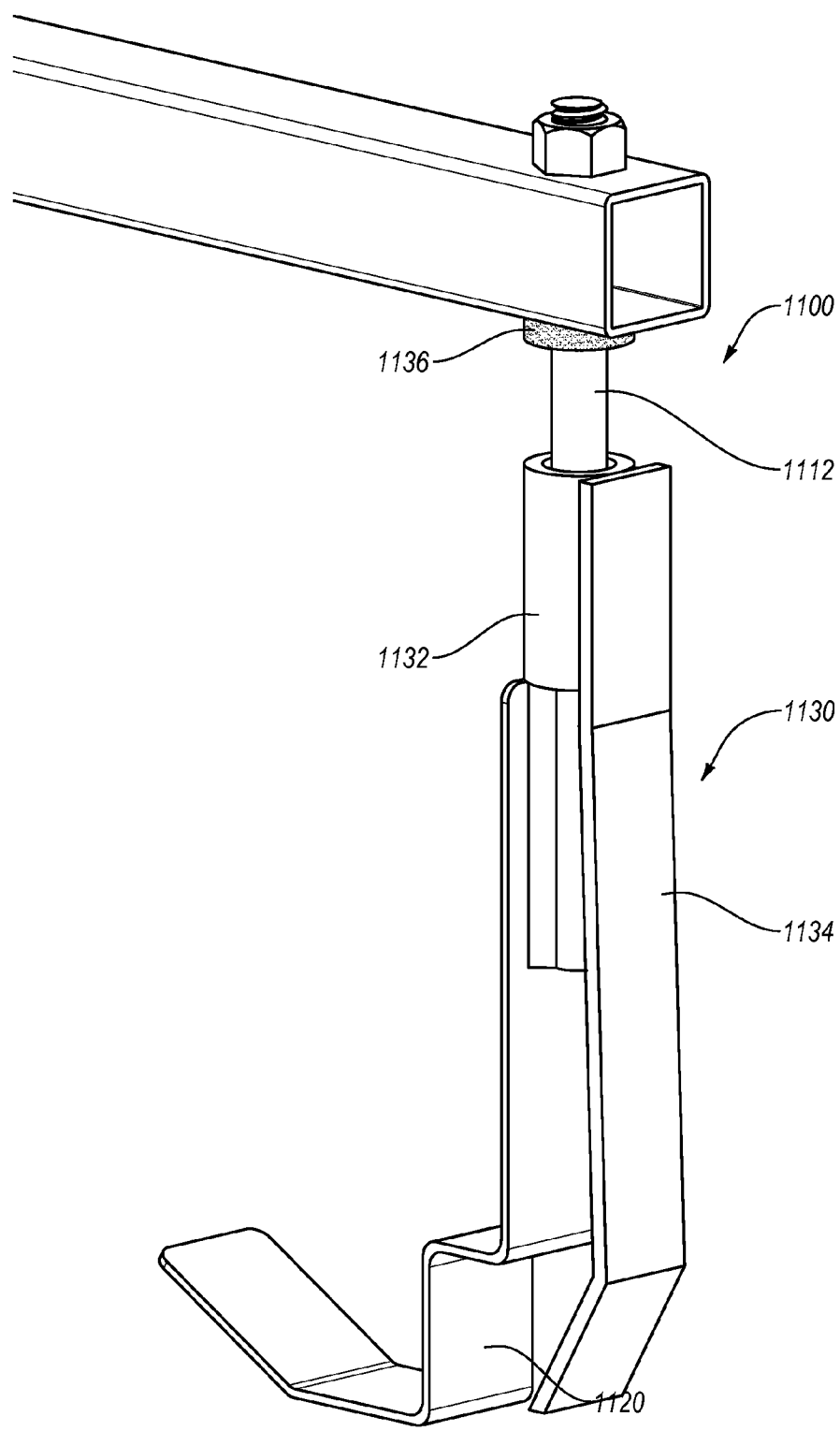
FIG. 11 is a perspective view of one embodiment of a rear hook with a hold-down mechanism.

A hook for use with a window of a removable vehicle top will now be described with reference to FIGS. 11, 12A, and 12B. FIG. 11 shows a hook 1100 that includes a threaded rod 1112, slim hook portion 1120, magnet washer 1136, and hold-down mechanism 1130. The threaded rod 1112 may be connected to an arm, such as a rear arm, of a removable vehicle top lift system. As shown in FIG. 11, threaded rod 1112 extends through magnet washer 1136 and an arm of a removable vehicle top lift system and is secured to the arm by a nut. Other fasteners herein described or known in the art may also be used to connect the hook 1100 to an arm of a removable vehicle top lift system.

Slim hook portion 1120 is connected to the threaded rod 1112. Slim hook portion is designed to engage a removable vehicle top between or in connection with a window portion of the removable vehicle top. As will be described with reference to FIGS. 12A and 12B, the slim hook portion extends along the exterior of a removable vehicle top, fits between a window of a removable vehicle top and other structure of the removable vehicle top, and engages an interior portion of a removable vehicle top that is inside a window of the removable vehicle top. Slim hook portion 1120 is shown in FIG. 11 as a substantially flat piece of metal. Alternatively, the slim hook portion may not be substantially flat but may be sized and configured to complement and engage a removable vehicle top at a window.

Hold-down mechanism 1130 includes a collar 1132 and a downward extension 1134. Threaded rod 1112 is inserted through collar 1132 such that collar 1132 and hold-mechanism 1130 may slide along a portion of threaded rod 1112. Downward extension 1134 is connected to and extends downwardly away from collar 1132. Downward extension 1134 is configured to sit on the exterior of a window of a removable vehicle top while the hook 1100 is engaged with the removable vehicle top. The downward extension 1134 extends down over a portion of the window so as to help prevent the window from opening while the removable vehicle top is engaged with the removable vehicle top lift system. Downward extension 1134 may include padding, such as rubber coating, to prevent damage to a window of a removable vehicle top that makes contact with the downward extension of 1134.

Figure 12A:
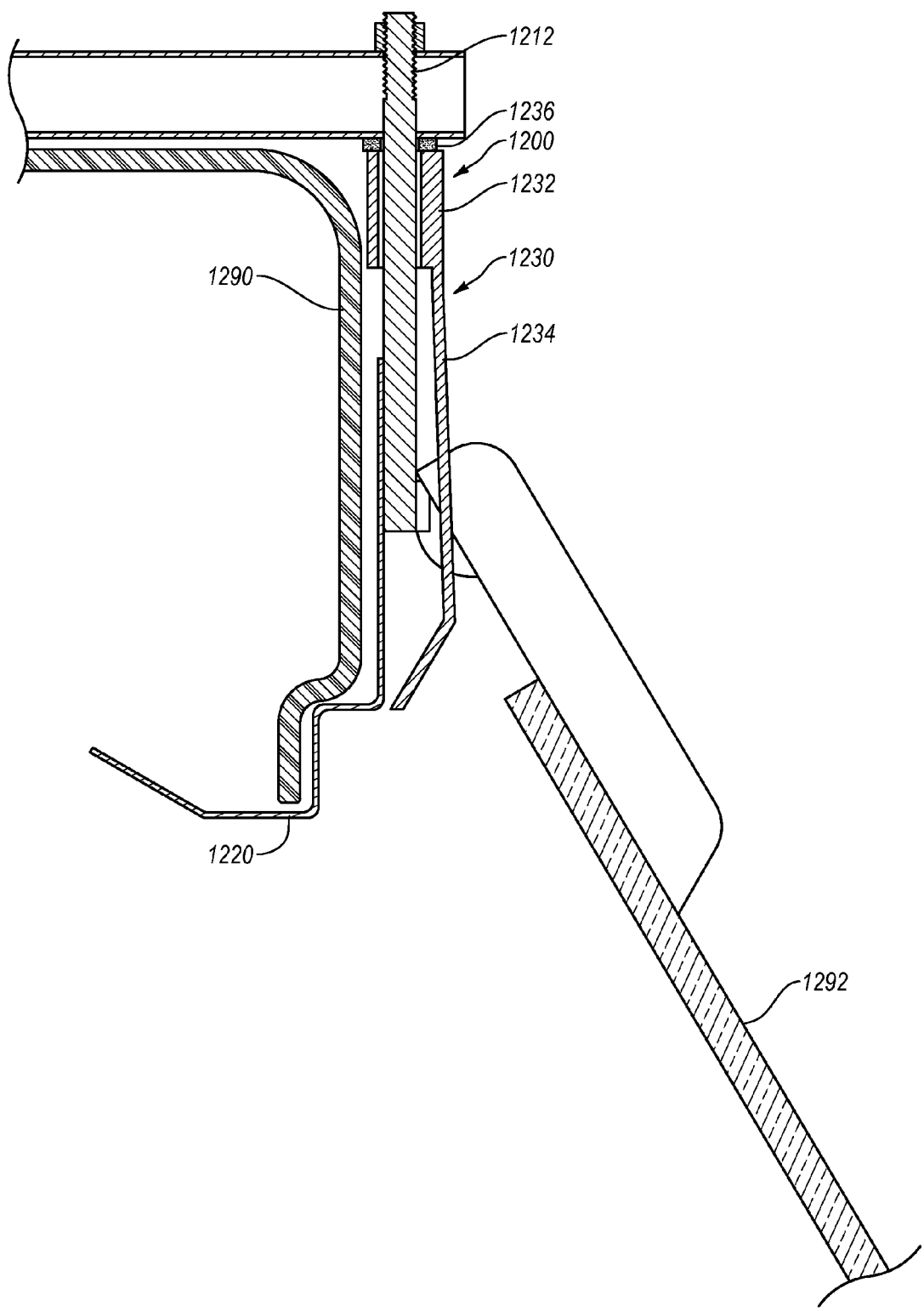
FIG. 12A is a side view of one embodiment of a rear hook with a hold-down mechanism in a first position.

FIG. 12A shows a side view of a hook 1200 while in use with a removable vehicle top 1290 that includes a window 1292. As shown in FIG. 12A, window 1292 is partially open such that it is extending away from removable vehicle top 1290. Collar 1232 of hold-down mechanism 1230 is raised up along threaded rod 1212 such that the downward extension 1234 of hold-down mechanism 1230 does not interfere with the operation, e.g., opening, of window 1292. Hold-down mechanism 1230 may be held in this raised position magnet 1236, which prevents the hold-down mechanism 1230 from inadvertently sliding down along threaded rod 1212. While hold-down mechanism 1230 may be held in place by magnet 1236, hold-down mechanism 1230 may be disengaged from magnet 1236 by manually sliding hold-down mechanism 1230 away from magnet 1236. The complementary shape of slim hook portion 1220 is also shown in complement to the structure of the removable vehicle top 1290.

Figure 12B:
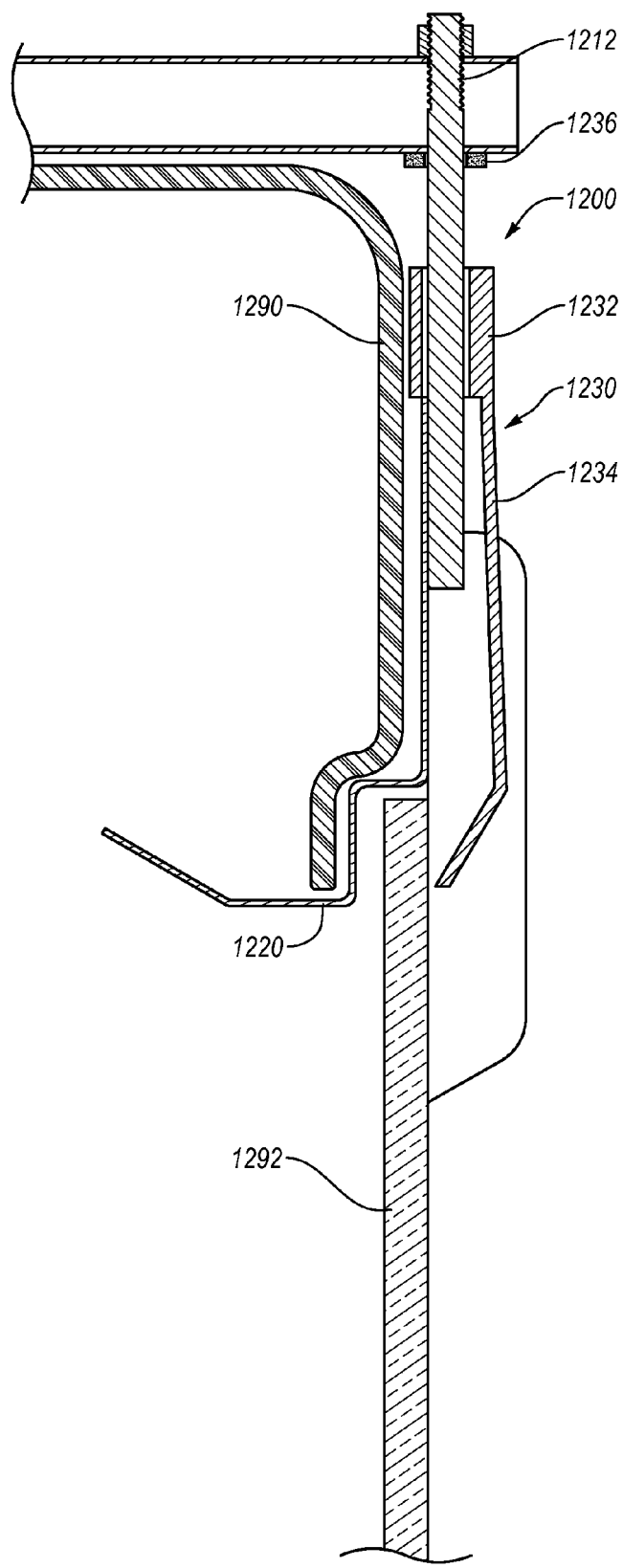
FIG. 12B is a side view of the rear hook of FIG. 12A with the hold-down mechanism in a second position.

FIG. 12B shows a side view of hook 1200 in use with the removable vehicle top 1290 of FIG. 12A but with window 1292 in a closed position. Collar 1232 of hold-down mechanism 1230 is lowered along threaded rod 1212 so that the downward extension 1234 of hold-down mechanism extends over a portion of window 1292. Collar 1232 may be prevented from sliding too far down threaded rod 1212 through contact with slim hook portion 1220. Other structure or shape of hook 1200 may be used to restrain the slide distance of collar 1232 along threaded rod 1212. With collar 1232 lowered, downward extension 1234 extends over a portion of window 1292 and assists in preventing unwanted opening of window 1292 while removable vehicle top 1290 is connected to a removable vehicle top lift system. Ordinarily, gravity alone will be sufficient to keep hold-down mechanism in a lowered position. However, other forms of retaining hold-down mechanism in either a raised or lowered position may also be used. For example, hook 1200 may also include depressible push buttons, pins, screws, ties, or other fasteners to retain a hold-down mechanism in a desired position. Alternatively, the shape of hook 1200 may allow for friction to retain a hold-down mechanism in position.

A hold-down mechanism for a hook may also include straps or cords connected to the hook and a portion of a window of a removable vehicle top. For example, a strap may extend from a portion of a hook on the interior of a window of a removable vehicle top and extend down to the bottom portion of the window so as to prevent the window from swinging open while the removable vehicle top lift system is connected to the removable vehicle top.

Figure 13:
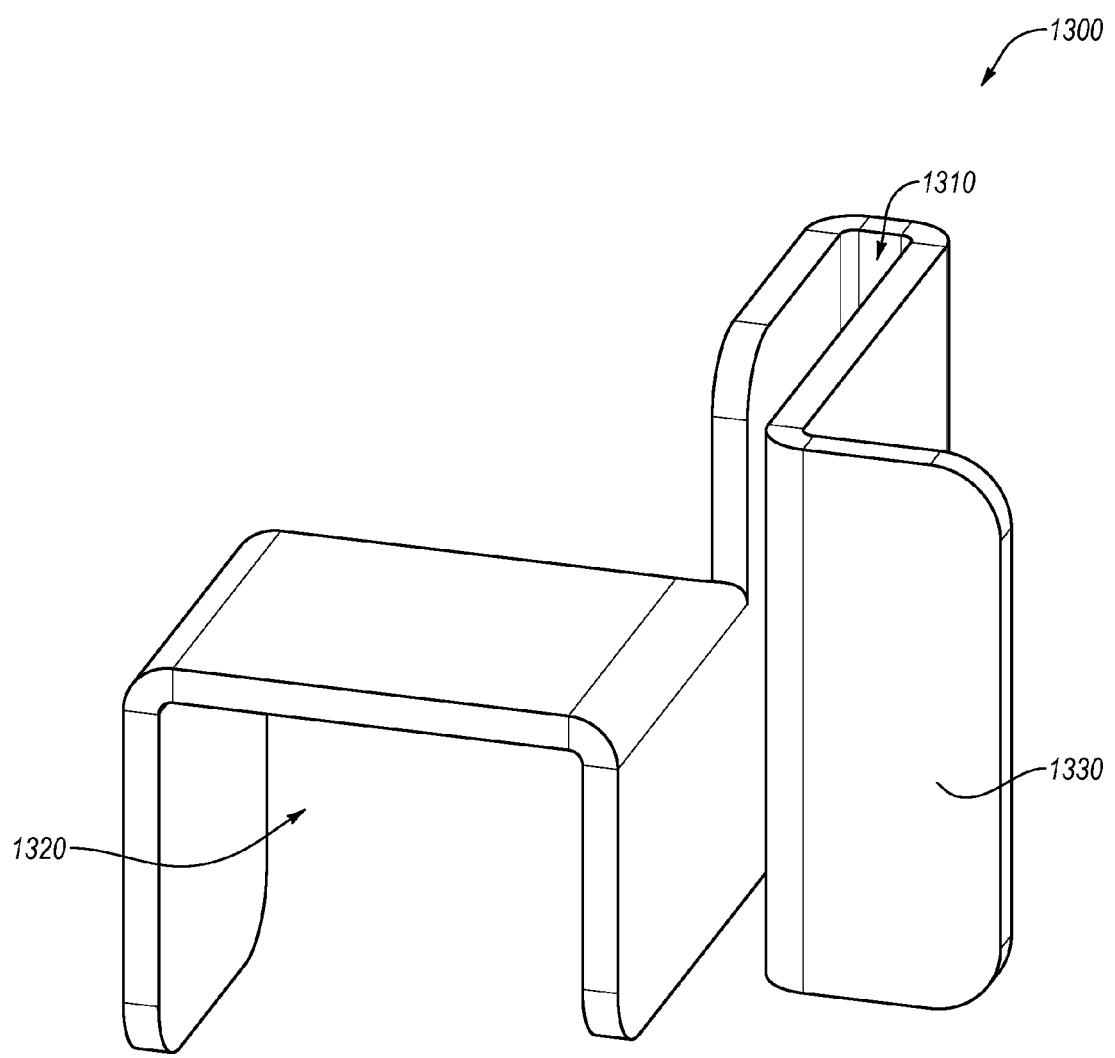
FIG. 13 is a perspective view of a hold-down bracket for use in connection with a removable vehicle top lift system.

FIG. 13 shows a hold-down bracket for use with a removable vehicle top lift system, which may be used alone or in addition to other hold-down mechanisms such as hold-down mechanism 1230 of hook 1200. Hold-down bracket 1300 includes a window channel 1310, a frame channel 1320, and a grip 1330. As will be described further with reference to FIGS. 13A-B, window channel 1310 is configured to engage a window of a removable vehicle top. The window of the removable vehicle top fits in the window channel 1310 of hold-down bracket 1300 such that hold-down bracket 1300 can slide along the window. While hold-down bracket 1300 is configured to that window channel 1310 slides along a side of a window of a removable vehicle top, a hold-down bracket may also be configured to engage and slide along the bottom or top of a window.

Frame channel 1320 of hold-down bracket 1300 is configured to engage a frame, or non-window, portion of a removable vehicle top. Therefore, and as will be shown with reference to FIGS. 13A-B, when frame channel 1320 is engaged with the frame of a removable vehicle top and window channel 1310 is engaged with a window of the removable vehicle top, the window is held in place with respect to the frame.

Grip 1330 is an extended portion of hold-down bracket 1300 that may be grasped by a user to slide hold-down bracket 1300 along the window of a removable vehicle top. Thus, a user may slide hold-down bracket 1300 into and out of engagement with a frame of the removable vehicle top.

FIG. 13A shows a side view of the hold-down bracket 1300 in use with a removable vehicle top. The removable vehicle top section shown in FIG. 13A includes a window 1392 and a frame section 1394. As shown in FIG. 13A, window 1392 sits in window channel 1310. Also frame 1394 is shown disposed in frame channel 1320. Thus, FIG. 13A shows hold-down bracket 1300 in a locked position.

A user may grasp grip 1330 to slide hold-down bracket 1300 to an unlocked position, as shown in FIG. 13B. FIG. 13B shows bracket 1330 that has been raised along window 1392 such that frame section 1394 no longer is disposed within frame channel 1320. Window 1392 is still shown in FIG. 13B as engaged with window channel 1310 of hold-down bracket 1300. As shown in FIGS. 13A-B, a hold down bracket may be used to retain a windows position in relationship to the frame of a removable vehicle top.

Although the subject matter has been described in language specific to structural features or methodological acts, it is to be understood that the subject matter defined in the appended claims is not necessarily limited to the specific features or acts described above. Rather, the specific features and acts described above are disclosed as example forms of implementing the claims.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A removable vehicle top lift system comprising:
a T-shaped body having and top portion with a left end and a right end, the left end of the top portion of the T-shaped body configured to selectively couple to an adjustable-length left arm between at least a predetermined first locking position and a predetermined second locking position, the right end of the top portion of the T-shaped body configured to selectively couple to an adjustable-length right arm between at least a predetermined first locking position and a predetermined second locking position, the T-shaped body also having a distal portion with a proximal end and a distal end, the proximal end of the distal portion of the T-shaped body being coupled to the top portion of the T-shaped body and the distal end of the distal portion of the of the T-shaped body being configured to selectively couple to a rear arm;
the adjustable-length left arm comprising a proximal end, configured to selectively couple to the left end of the T-shaped body, and a distal end coupled to a left hook;
the adjustable-length right arm comprising a proximal end, configured to selectively couple to the right end of the T-shaped body, and a distal end coupled to a right hook; and
the rear arm comprising a proximal end, configured to selectively couple to the distal portion of the T-shaped body, and a distal end coupled to a rear hook;
wherein the rear hook is configured to allow a rear window of a removable vehicle top to close completely while the rear hook participates in suspending the removable vehicle top from the removable vehicle top lift system, wherein the rear hook comprises a substantially flat hook portion configured to penetrate a gap between the rear window and the removable vehicle top when the rear window is completely closed.

2. The removable vehicle top lift system of claim 1, wherein the top portion of the T-shaped body may be selectively coupled to the distal portion of the T-shaped body.

3. The removable vehicle top lift system of claim 1, wherein the top portion of the T-shaped body and the distal portion of the T-shaped body comprise a unitary structure.

4. The removable vehicle top lift system of claim 1, wherein the left end of the top portion of the T-shaped body is further configured with a plurality of holes to receive a depressible push pin coupled to the proximal end of the adjustable-length left arm, and where the right end of the top portion of the T-shaped body is further configured with a plurality of holes to receive a depressible push pin coupled to the proximal end of the adjustable-length right arm.

5. The removable vehicle top lift system of claim 1, wherein each of the left end of the top portion of the T-shaped body, the right end of the top portion of the T-shaped body, the proximal end of the adjustable-length left arm, and the proximal end of the adjustable-length right arm are further configured with holes to receive a removable fastener.

6. The removable vehicle top lift system of claim 1 further comprising at least one pad configured to prevent the T-shaped body, the adjustable-length left arm, the adjustable-length right arm, or the rear arm from contacting a removable vehicle top coupled to the vehicle top lift system.

7. The removable vehicle top lift system of claim 1 further comprising padding configured to receive at least portion of a removable vehicle top and to retain the at least a portion of the removable vehicle top above the T-shaped body while the remove vehicle top list system is in use.

8. The removable vehicle top lift system of claim 1 further comprising a balance mechanism configured to allow selective coupling of a lifting device at a plurality of points along the distal portion of the T-shaped body.

9. The removable vehicle top lift system of claim 8, wherein the balance mechanism comprises a slide and a locking screw that are configured to slide along the distal portion of the T-shaped body when the locking screw is an unlocked position and are configured to retain the slide and locking screw in a fixed position along the distal portion of the T-shaped body when the locking screw is in a locked position.

10. The removable vehicle top lift system of claim 8, wherein the balance mechanism comprises a fin coupled to the distal portion of the T-shaped body, the fin comprising a sheet of material with a plurality of holes.

11. The removable vehicle top lift system of claim 8, wherein the balance mechanism comprises a wave-shaped member that alternatively connects and extends away from the distal portion of the T-shaped body at a plurality of points.

12. The removable vehicle top lift system of claim 11, wherein the wave-shaped member is comprised of a flexible material.

13. The removable vehicle top lift system of claim 1, wherein the rear hook further comprises a rear window hold-down mechanism that is selectively movable between a first position, in which the hold-down mechanism is configured to keep the rear window of the removable vehicle top closed, and a second position in which the hold-down mechanism is configured to allow the rear window of the removable vehicle top to open.

14. The removable vehicle top lift system of claim 1, wherein at least one of the left hook, right hook, and rear hook is selectively detachable from the vehicle top list system.

15. The removable vehicle top lift system of claim 1, wherein at least one of the left hook, right hook, and rear hook is an L-shaped hook.

16. The removable vehicle top lift system of claim 1, further comprising a hold-down bracket with a window channel and frame channel, wherein the hold-down bracket is configured to slide along a window of a removable vehicle top between a first position in which the hold-down bracket allows the window to freely open and close and a second position in which the hold-down bracket prevents the window from opening.

17. A removable vehicle top lift system comprising:
a T-shaped body having and top portion with a left end and a right end, the left end of the T-shaped body includes a plurality of holes configured to selectively couple the left end of the top portion to an adjustable-length left arm between at least a first locking position and a second locking position, the right end of the T-shaped body includes a plurality of holes configured to selectively couple the right end of the top portion to an adjustable-length right arm between at least a first locking position and a second locking position, the T-shaped body also having a distal portion selectively coupled to the top end, the distal portion including a proximal end and a distal end, the proximal end of the distal portion of the T-shaped body being coupled to the top portion of the T-shaped body and the distal end of the distal portion of the T-shaped body being configured to selectively couple to a rear arm;
the adjustable-length left arm comprising a proximal end with a depressible push pin configured to selectively couple with at least one of the plurality of holes of the left end of the T-shaped body, the adjustable-length left arm further comprising a distal end coupled to a left hook;
the adjustable-length right arm comprising a proximal end with a depressible push pin configured to selectively couple with at least one of the plurality of holes of the right end of the T-shaped body, the adjustable-length right arm further comprising a distal end coupled to a right hook;
the rear arm comprising a proximal end and a distal end, the proximal end of the rear arm being configured to selectively couple to the distal portion of the T-shaped body;
at least one pad configured to prevent the T-shaped body, the adjustable-length left arm, the adjustable-length right arm, or the rear arm from contacting a removable vehicle top coupled to the vehicle top lift system; and
a rear hook coupled to the distal end of the rear arm, wherein the rear hook is configured to allow a rear window of the removable vehicle top to close completely while the removable vehicle top is lift system is in use, the rear hook further comprising a rear window hold-down mechanism that is selectively movable between a first position, in which the hold-down mechanism is configured to keep the rear window of the removable vehicle top closed, and a second position in which the hold-down mechanism is configured to allow the rear window of the removable vehicle top to open.

* * * * *